US011924942B2

(12) United States Patent
Meng et al.

(10) Patent No.: US 11,924,942 B2
(45) Date of Patent: Mar. 5, 2024

(54) LIGHT-EMITTING DIODE (LED) DRIVER SYSTEM WITH SLEW-RATE CONTROL

(71) Applicant: TEXAS INSTRUMENTS INCORPORATED, Dallas, TX (US)

(72) Inventors: Xianghao Meng, Shanghai (CN); Shangquan Liang, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/127,162

(22) Filed: Mar. 28, 2023

(65) Prior Publication Data

US 2023/0239980 A1 Jul. 27, 2023

Related U.S. Application Data

(63) Continuation of application No. 17/537,694, filed on Nov. 30, 2021, now Pat. No. 11,653,432.

(51) Int. Cl.

*H05B 45/30* (2020.01)
*H05B 45/34* (2020.01)
*H05B 45/345* (2020.01)
*H05B 45/48* (2020.01)

(52) U.S. Cl.

CPC ............. *H05B 45/48* (2020.01); *H05B 45/34* (2020.01); *H05B 45/345* (2020.01)

(58) Field of Classification Search

CPC ...... H05B 45/30; H05B 45/34; H05B 45/345; H05B 45/48; H05B 47/10

See application file for complete search history.

(56) References Cited

U.S. PATENT DOCUMENTS

| | | | | |
|---|---|---|---|---|
| 9,882,497 | B2 | 1/2018 | Cleveland | |
| 2017/0359866 | A1 | 12/2017 | Elo | |
| 2020/0413575 | A1* | 12/2020 | Chu | H02M 1/44 |

* cited by examiner

*Primary Examiner* — Jimmy T Vu

(74) *Attorney, Agent, or Firm* — Charles F. Koch; Frank D. Cimino

(57) ABSTRACT

One example described herein includes a light-emitting diode (LED) driver system. The system includes an error amplifier configured to compare an input voltage with a reference voltage to generate a control voltage. The system further includes an amplifier output stage configured to control an output current through a first current path and a shunt current through a second current path based on the control voltage. The amplifier output stage comprises a slew-rate controller configured to control a slew-rate of the shunt current. The shunt current can be provided through a shunt resistor in the second current path and added to the output current to provide a total current through an LED string.

18 Claims, 3 Drawing Sheets

300

302

LIGHT-EMITTING DIODE (LED) DRIVER SYSTEM WITH SLEW-RATE CONTROL

CROSS-REFERENCE TO RELATED APPLICATION

This application is a continuation of prior application Ser. No. 17/537,694 filed Nov. 30, 2021, currently pending, which is incorporated herein by reference in its entirety.

TECHNICAL FIELD

This description relates generally to electronic circuits, and more particularly to an LED driver system with slew-rate control.

BACKGROUND

Light-emitting diodes (LEDs) are implemented for a variety of illumination applications. For some illumination applications, LEDs are arranged in series as an LED string to provide sufficient illumination intensity, such as on vehicle indicator lights (e.g., turn signals, brake-lights, reverse-indicators, etc. for an automobile). Driver circuits can regulate current that is delivered through the LED strings to activate the LED strings for illumination. As an example, the driver circuit can regulate the current amplitude based on an amplitude of a supply voltage, such as from a battery of other dynamic voltage source.

SUMMARY

One example described herein includes a light-emitting diode (LED) driver system. The system includes an error amplifier configured to compare an input voltage with a reference voltage to generate a control voltage. The system further includes an amplifier output stage configured to control an output current through a first current path and a shunt current through a second current path based on the control voltage. The amplifier output stage comprises a slew-rate controller configured to control a slew-rate of the shunt current. The shunt current can be provided through a shunt resistor in the second current path and being added to the output current to provide a total current through an LED string.

Another example described herein includes an LED system. The system includes an error amplifier configured to compare an input voltage with a reference voltage to generate a control voltage. The system also includes an amplifier output stage configured to control an output current through a first current path and a shunt current through a second current path based on the control voltage. The amplifier output stage comprises a slew-rate controller configured to control a slew-rate of the shunt current. The system further includes a shunt resistor in the second current path and being configured to conduct the shunt current. The system further includes an LED string arranged at an output of the first current path and the second current path and being configured to illuminate in response to a total current comprising a sum of the output current and the shunt current.

Another example described herein includes an LED driver system. The system includes a first power transistor comprising an input and an output coupled to receive an LED string and a second power transistor comprising an input and an output coupled to receive an LED string and a shunt resistor. The system also includes an error amplifier comprising a first input to receive an input voltage, a second input to receive a reference voltage, and an output to provide a control voltage. The system further includes an amplifier output stage comprising an input coupled to the output of the error amplifier, a first output coupled to the input of the first power transistor, and a second output coupled to the input of the second power transistor. The amplifier output stage includes a slew-rate controller, the slew-rate controller comprising an output coupled to the input of the second power transistor.

DETAILED DESCRIPTION

Figure 2:
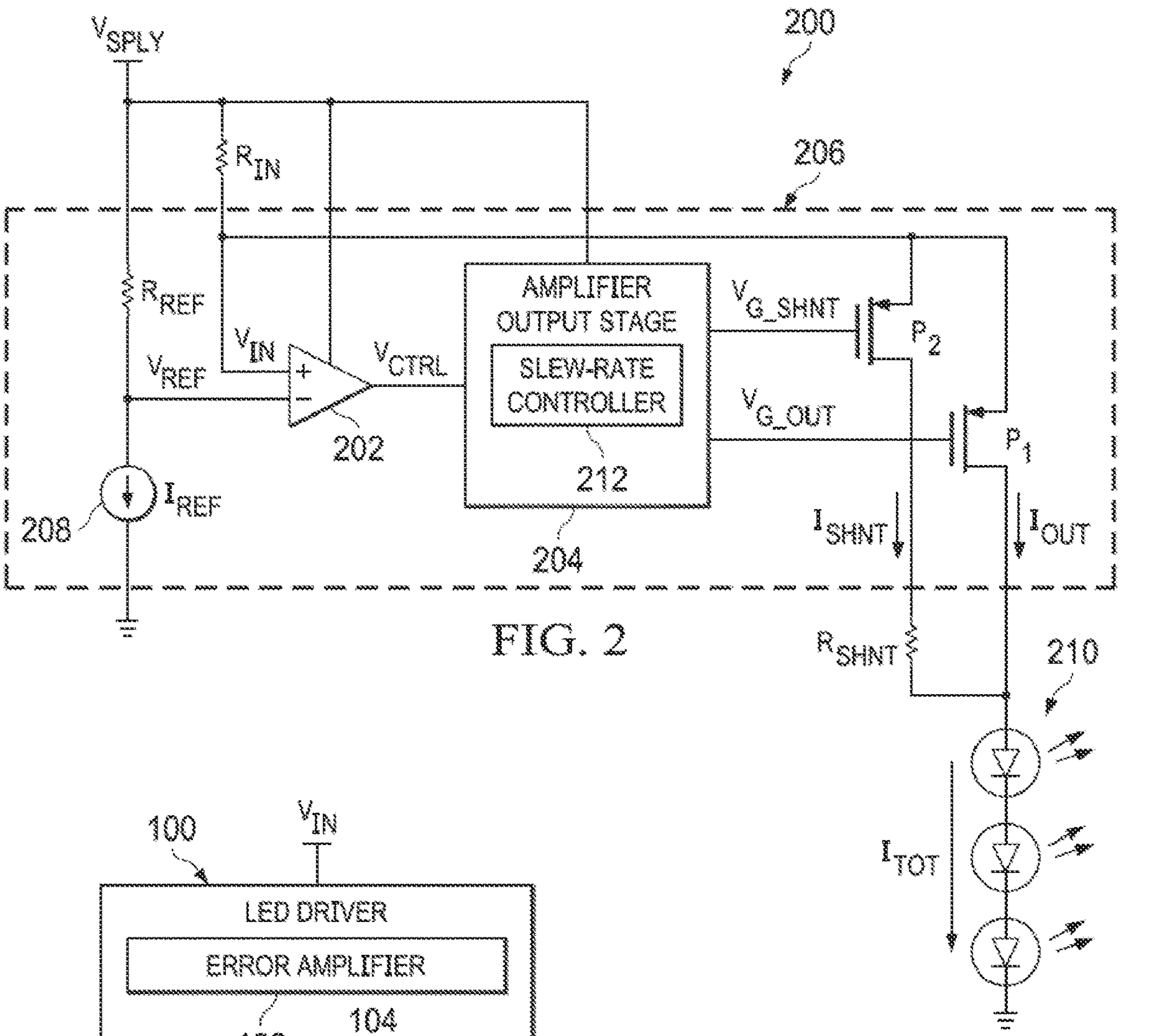
FIG. 2 is an example of an LED driver circuit.

This description relates generally to electronic circuits, and more particularly to an LED driver system with slew-rate control. The LED driver system can be implemented in any of a variety of LED control systems to provide illumination, such as a vehicle. For example, multiple LED driver systems described herein can be implemented in an automobile for controlling indicator lights. The LED driver system includes an error amplifier that is configured compare an input voltage with a reference voltage, and to provide a control voltage in response to the comparison. As an example, the input voltage can be provided based on a supply voltage, such as provided from a battery. The LED driver system also includes an LED string that is coupled to a first current path and includes a shunt resistor that is arranged in a second current path and which is coupled to the first current path.

The LED driver system further includes an amplifier output stage that is configured to generate a transistor input voltage based on the control voltage. The transistor input voltage can be provided to control a power transistor that can conduct a portion of a total output current through the shunt resistor. As an example, the second current path can conduct a shunt current and the first current path can conduct an output current that is added to the shunt current to be provided through the LED string as a total current. The amplifier output stage can control the respective amplitudes of the output current and the shunt current based on the resistance of the shunt resistor and the control voltage provided by the error amplifier. As an example, the output current and the shunt current can have an approximately constant amplitude sum, expressed as a total output current, such that a greater proportion of a total output current is provided through the shunt resistor as the input voltage increases relative to the reference current.

As an example, the transistor input voltage includes a first transistor input voltage and a second transistor input voltage that are provided to a first power transistor that conducts the output current and a second power transistor that conducts the shunt current, respectively. The first and second transistor input voltages can be generated by the amplifier output stage based on the control voltage being provided to first and second control transistors that can conduct respective first and second control currents. However, the second power transistor can also be controlled by a slew-rate controller that is configured to control a slew-rate of the shunt current through the shunt resistor. As an example, the slew-rate controller can conduct an offset current in parallel with the second control current to generate the second transistor input voltage. The offset current can be controlled based on a charging capacitor, such that the slew-rate of the offset current can likewise control the slew-rate of the shunt current. Accordingly, by controlling the slew-rate of the shunt current through the shunt resistor, transient effects and electromagnetic interference (EMI) can be mitigated in the LED driver system.

Figure 1:
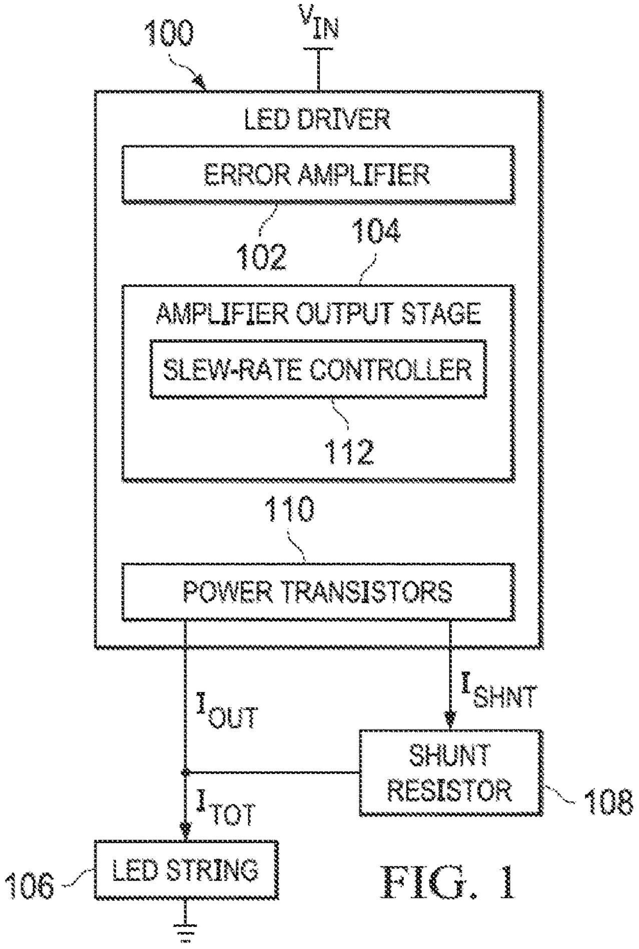
FIG. 1 is an example block diagram of an LED driver system.

FIG. 1 is an example block diagram of an LED driver system 100. The LED driver system 100 can be implemented in any of a variety of LED control systems to provide illumination, such as a vehicle. For example, multiple LED driver systems 100, as described herein, can be implemented in an automobile for controlling indicator lights.

The LED driver system 100 includes an error amplifier 102, an amplifier output stage 104, an LED string 106, and a shunt resistor 108. As an example, the error amplifier 102 and the amplifier output stage 104 can be fabricated in or as part of an integrated circuit (IC) chip. The error amplifier 102 is configured to compare an input voltage with a reference voltage, and to provide a control voltage in response to the comparison. In the example of FIG. 1, the LED driver system 100 is demonstrated as receiving a supply voltage $V_{SPLY}$, which can be a voltage provided from a battery. Thus, the input voltage can be based on the supply voltage $V_{SPLY}$. The reference voltage can be an approximately constant voltage, such as generated from a constant current source.

The amplifier output stage 104 can be configured to control an amplitude of an output current $I_{OUT}$ in a first current path and the amplitude of a shunt current $I_{SHNT}$ in a second current path that includes the shunt resistor 108. The amplifier output stage 104 can control the respective amplitudes of the output current $I_{OUT}$ and the shunt current $I_{SHNT}$ based on the control voltage provided by the error amplifier. As an example, the output current $I_{OUT}$ and the shunt current $I_{SHNT}$ can have an approximately constant amplitude sum, expressed as a total output current $I_{TOT}$ that is provided through the LED string 106, such that a greater proportion of a total output current $I_{TOT}$ is provided through the shunt resistor as the input voltage increases relative to the reference voltage. Because the shunt resistor 108 can be arranged external to the IC chip that can accommodate the error amplifier 102 and the amplifier output stage 104, the LED driver system 100 can therefore provide thermal protection for the IC chip by diverting excess current resulting from higher amplitudes of the supply voltage $V_{SPLY}$ through the shunt resistor 108.

In the example of FIG. 1, the LED driver system 100 includes power transistors 110. As an example, amplifier output stage 104 can generate a first transistor input voltage and a second transistor input voltage that are provided to a first power transistor of the power transistors 110 that conducts the output current $I_{OUT}$ and a second power transistor of the power transistors 110 that conducts the shunt current $I_{SHNT}$, respectively. The first and second transistor input voltages can be generated by the amplifier output stage 104 based on the control voltage being provided to first and second control transistors that can conduct respective first and second control currents. As an example, the first and second control currents generate the transistor input voltages of the respective first and second power transistors. In the example of FIG. 1, the amplifier output stage 104 also includes a slew-rate controller 112. The slew-rate controller 112 is configured to control the slew-rate of the shunt current $I_{SHNT}$ through the shunt resistor 108.

As an example, the slew-rate controller 112 can generate an offset current in parallel with the second control current to generate the second transistor input voltage. As an example, the slew-rate controller 112 can include a charging capacitor and at least one current mirror. The charging capacitor can be charged by a charging current to generate a charging voltage, such that the charging voltage can control an amplitude of a current at a slew-rate based on the capacitance of the charging capacitor. The offset current can be controlled based on a charging capacitor, such that the slew-rate of the offset current can likewise control the slew-rate of the shunt current $I_{SHNT}$. Accordingly, by controlling the slew-rate of the shunt current $I_{SHNT}$ through the shunt resistor, transient effects and electromagnetic interference (EMI) can be mitigated in the LED driver system 100.

FIG. 2 is an example of an LED driver circuit 200. The LED driver circuit 200 can be the LED driver system 100 in the example of FIG. 1. Therefore, reference is to be made to the example of FIG. 1 in the following description of the example of FIG. 2.

The LED driver circuit 200 includes an error amplifier 202 and an amplifier output stage 204. In the example of FIG. 2, the error amplifier 202 and the amplifier output stage 204 can be fabricated in or as part of an integrated circuit (IC) chip, demonstrated at 206. In the example of FIG. 2, the error amplifier 202 is configured to compare an input voltage $V_{IN}$ with a reference voltage $V_{REF}$, and to provide a control voltage $V_{CTRL}$ in response to the comparison. In the example of FIG. 2, the LED driver circuit 200 is demonstrated as receiving a supply voltage $V_{SPLY}$, which can be a voltage provided from a battery. Thus, the input voltage $V_{IN}$ is generated based on the supply voltage $V_{SPLY}$ via an input resistor $R_{IN}$. The reference voltage $V_{REF}$ is generated based on a current source 208 that conducts a reference current $I_{REF}$ through a reference resistor $R_{REF}$ that is coupled to the supply voltage $V_{SPLY}$. Therefore, the reference voltage $V_{REF}$ can be an approximately constant voltage.

The amplifier output stage 204 is demonstrated in the example of FIG. 2 as providing a first input voltage $V_{G\_OUT}$ to an input (e.g., gate) of a first power transistor $P_1$ and a second input voltage $V_{G\_SHNT}$ to an input (e.g., gate) of a second power transistor $P_2$. The power transistors $P_1$ and $P_2$ are arranged as P-channel metal-oxide field-effect transistors (P-FETs) having a source coupled to the input voltage $V_{IN}$. The first power transistor $P_1$ is arranged in a first current path in which the output current $I_{OUT}$ flows from the input voltage $V_{IN}$, with the first current path being coupled to an LED string 210. The second power transistor $P_2$ is arranged in a second current path in which the shunt current $I_{SHNT}$ flows from the input voltage $V_{IN}$, with the second current path including a shunt resistor $R_{SHNT}$. The amplifier output stage 204 therefore controls an amplitude of the output current $I_{OUT}$ in the first current path that includes the LED string 210 and the shunt current $I_{SHNT}$ in the second current path that includes the shunt resistor $R_{SHNT}$ based on the control voltage $V_{CTRL}$.

In the example of FIG. 2, the output current $I_{OUT}$ and the shunt current $I_{SHNT}$ are combined to form a total output current $I_{TOT}$ that is provided through the LED string 210. As an example, the total output current $I_{TOT}$ can have an approximately constant amplitude sum of the output current $I_{OUT}$ and the shunt current $I_{SHNT}$, such that a greater proportion of a total output current $I_{TOT}$ is provided through the shunt resistor $R_{SHNT}$ as the input voltage $V_{IN}$ increases relative to the reference current $V_{REF}$. Because the shunt resistor $R_{SHNT}$ can be arranged external to the IC chip that can accommodate the error amplifier 202 and the amplifier output stage 204, the LED driver circuit 200 can therefore provide thermal protection for the associated IC chip by diverting excess current resulting from higher amplitudes of the supply voltage $V_{SPLY}$ through the shunt resistor $R_{SHNT}$.

Figure 3:
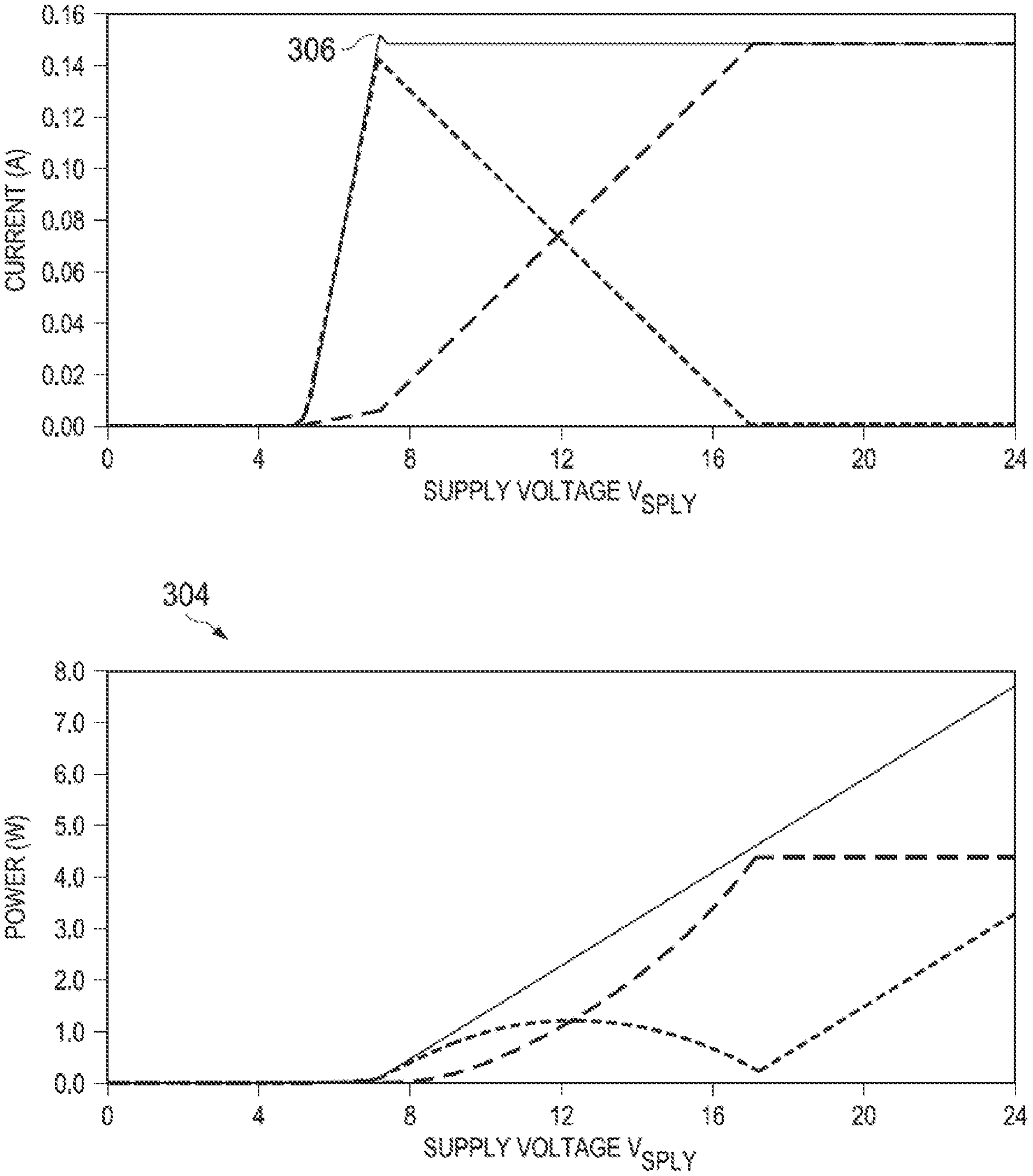
FIG. 3 is an example diagram of graphs.

FIG. 3 is an example diagram 300 of graphs. The diagram 300 includes a first graph 302 that plots current as a function of the supply voltage $V_{SPLY}$ and a second graph 304 that plots power as a function of the supply voltage $V_{SPLY}$. The current and power in the first and second graphs, respectively, can result from the operation of the LED driver circuit 200. Therefore, reference is to be made to the example of FIG. 2 in the following description of the example of FIG. 3.

The first graph 302 demonstrates three plots that are the total output current $I_{TOT}$ through the LED string 210, the output current $I_{OUT}$, and the shunt current $I_{SHNT}$ through the shunt resistor $R_{SHNT}$. In the example of FIG. 3, the total output current $I_{TOT}$ is demonstrated by a solid line, the output current $I_{OUT}$ is demonstrated by a dashed line, and the shunt current $I_{SHNT}$ is demonstrated by a dotted line. The first graph 302 demonstrates that the sum of the amplitude of the output current $I_{OUT}$ and the shunt current $I_{SHNT}$ is approximately equal to the amplitude of the total output current $I_{TOT}$. In the example of FIG. 3, the output current $I_{OUT}$ is approximately equal to the total output current $I_{TOT}$ to a supply voltage $V_{SPLY}$ of approximately 7 volts, at which time the power transistor $P_2$ is activated (e.g., with a gate-source voltage $V_{GS}$ that is greater than a threshold voltage) to begin conducting the shunt current $I_{SHNT}$. Therefore, as the supply voltage $V_{SPLY}$ increases, the output current $I_{OUT}$ decreases linearly, while the shunt current $I_{SHNT}$ increases linearly in an inverse manner.

The second graph 304 demonstrates three plots that are the total output power, as provided by the total output current $I_{TOT}$ through the LED string 210, the output current $I_{OUT}$, and the shunt current $I_{SHNT}$ through the shunt resistor $R_{SHNT}$, respectively. In the example of FIG. 3, the power consumption of the total output current $I_{TOT}$ is demonstrated by a solid line, the power consumption of the output current $I_{OUT}$ is demonstrated by a dashed line, and the power consumption of the shunt current $I_{SHNT}$ is demonstrated by a dotted line. Similar to the first graph 302, the second graph 304 demonstrates that the sum of the power of the output current $I_{OUT}$ and the shunt current $I_{SHNT}$ is approximately equal to the power of the total output current $I_{TOT}$. In the example of FIG. 3, the power dissipated in the IC 206 remains constant at amplitudes of the supply voltage $V_{SPLY}$ that are greater than or equal to approximately 17 volts. Additional power consumption greater than approximately 17 volts is provided through the shunt resistor $R_{SHNT}$.

As a result of the operation of the amplifier output stage 204, the LED driver circuit 200 can mitigate thermal dissipation within the IC 206 resulting from excessive current flow that is based on higher amplitudes of the supply voltage $V_{SPLY}$. As demonstrated in the example of FIG. 3, the LED driver circuit 200 can mitigate thermal dissipation in the IC 206 by diverting larger portions of the total output current $I_{TOT}$ as the shunt current $I_{SHNT}$ through the shunt resistor $R_{SHNT}$, and thereby dissipating heat in the shunt resistor $R_{SHNT}$, as the supply voltage $V_{SPLY}$ increases.

Referring back to the example of FIG. 2, the amplifier output stage 204 includes a slew-rate controller 212. The slew-rate controller 212 is configured to control the slew-rate of the shunt current $I_{SHNT}$ through the shunt resistor $R_{SHNT}$. As an example, the slew-rate controller 212 can generate an offset current in parallel with the second control current to generate the second transistor input voltage $V_{G\_SHNT}$. The offset current can have a predefined slew-rate that can result in a more gradual decrease of the second transistor input voltage $V_{G\_SHNT}$, which can result in a more gradual increase of the amplitude of the shunt current $I_{SHNT}$.

As described herein, by controlling the slew-rate of the shunt current $I_{SHNT}$ through the shunt resistor $R_{SHNT}$, transient effects and EMI can be mitigated in the LED driver circuit 200. Particularly, with reference to the example of FIG. 3, the total current $I_{TOT}$ includes a small amplitude spike, demonstrated at 306, that is a transient increase resulting from the second power transistor $P_2$ changing from the cutoff mode to the linear mode. The slew-rate control of the second transistor input voltage $V_{G\_SHNT}$ can mitigate the transient current amplitude spike, thereby settling the amplitude of the total current $I_{TOT}$. Furthermore, controlling the slew-rate of the second transistor input voltage $V_{G\_SHNT}$, and thus the amplitude of the shunt current $I_{SHNT}$, can reduce undesired EMI that can introduce noise in the LED driver circuit 200 and/or other proximal circuits.

Figure 4:
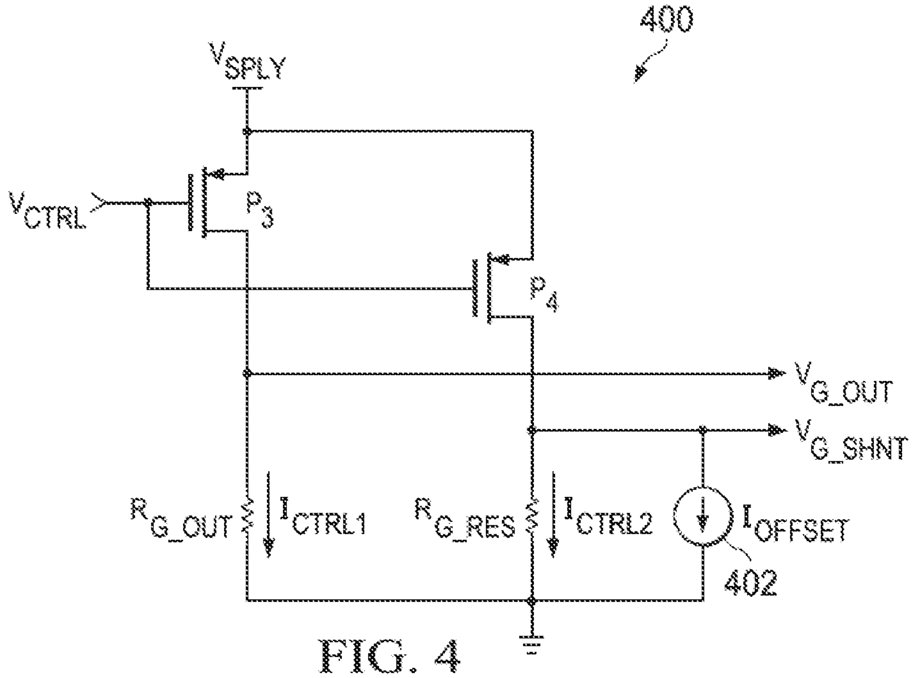
FIG. 4 is an example of an amplifier output stage circuit.

FIG. 4 is an example of an amplifier output stage circuit 400. The amplifier output stage circuit 400 can be the amplifier output stage 204 in the example of FIG. 2. Therefore, reference is to be made to the examples of FIGS. 2 and 3 in the following example of FIG. 4.

The amplifier output stage circuit 400 includes a first control transistor $P_3$ and a second control transistor $P_4$ that are each provided the control voltage $V_{CTRL}$ to respective inputs (e.g., gates). In the example of FIG. 4, the control transistors $P_3$ and $P_4$ are arranged as P-FETs having a source coupled to the supply voltage $V_{SPLY}$. In response to the control voltage $V_{CTRL}$, the first control transistor $P_3$ is configured to conduct a first control current $I_{CTRL1}$ from the supply voltage $V_{SPLY}$ through a resistor $R_{G\_OUT}$ to generate the first transistor input voltage $V_{G\_OUT}$. Similarly, in response to the control voltage $V_{CTRL}$, the second control transistor $P_4$ is configured to conduct a second control current $I_{CTRL2}$ from the supply voltage $V_{SPLY}$ through a resistor $R_{G\_RES}$ to generate the second transistor input voltage $V_{G\_SHNT}$. As described above, the first and second transistor input voltages $V_{G\_OUT}$ and $V_{G\_SHNT}$ are provided to the inputs of the respective first and second power transistors $P_1$ and $P_2$ to control the output current $I_{OUT}$ and the shunt current $I_{SHNT}$, respectively.

In the example of FIG. 4, the amplifier output stage circuit 400 includes a slew-rate controller 402 that is demonstrated as a current source configured to conduct an offset current $I_{OFFSET}$ in parallel with the second control current $I_{CTRL2}$. The offset current $I_{OFFSET}$ can have a predefined slew-rate, such that the offset current $I_{OFFSET}$ can decrease the second transistor input voltage $V_{G\_SHNT}$ at the slew-rate. As a result, the second power transistor $P_2$ can more gradually increase the amplitude of the shunt current $I_{SHNT}$ after transitioning from the cutoff mode to the linear mode. Accordingly, transient effects of the total output current $I_{TOT}$ and undesired EMI can be mitigated in the LED driver circuit 200, as described herein.

Figure 5:
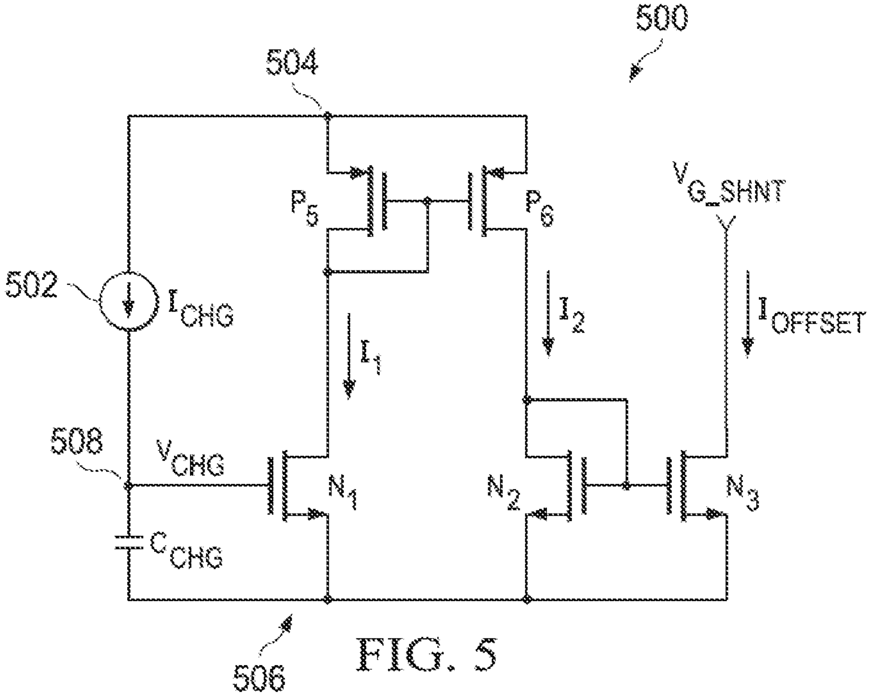
FIG. 5 is an example of a slew-rate controller circuit.

FIG. 5 is an example of a slew-rate controller circuit 500. The slew-rate controller circuit 500 can be the slew-rate controller 402 in the example of FIG. 4. Therefore, reference is to be made to the example of FIG. 4 in the following description of the example of FIG. 5.

The slew-rate controller circuit 500 includes a charging current source 502 that is configured to conduct a charging current $I_{CHG}$ from a high-voltage rail, demonstrated at 504. As an example, the charging current $I_{CHG}$ (e.g., less than 20

μA, such as 10 μA) can be provided in response to the second control current $I_{CTRL2}$, such as based on the second control current $I_{CTRL2}$. The slew-rate controller circuit 500 also includes a charging capacitor $C_{CHG}$ that is arranged between the charging current source 502 and a low-voltage rail 506 (e.g., ground). The charging capacitor $C_{CHG}$ can have a capacitance value that defines the slew-rate of the offset current $I_{OFFSET}$, and thus the slew-rate of the second transistor input voltage $V_{SHNT}$ and the slew-rate of the shunt current $I_{SHNT}$.

In response to activation of the charging current source 502, the charging current $I_{CHG}$ begins to charge the charging capacitor $C_{CHG}$, which causes a charging voltage $V_{CHG}$ to increase at a rate that is based on the capacitance of the charging capacitor $C_{CHG}$. The charging voltage $V_{CHG}$ can be provided on a charging terminal 508 that is coupled to an input (e.g., gate) of a transistor $N_1$, demonstrated as an N-channel FET (N-FET). Therefore, the charging voltage $V_{CHG}$ can control the N-FET $N_1$ to conduct a current $I_1$ through the N-FET $N_1$ and through a P-FET $P_5$. The P-FET $P_5$ is demonstrated in the example of FIG. 5 as diode-connected, such that the drain and gate of the P-FET $P_5$ are coupled, and are likewise coupled to a gate of a P-FET $P_6$. Therefore, the P-FET $P_6$ operates as a current-mirror with respect to the N-FET $N_1$ and the P-FET $P_5$ to conduct a current $I_2$. The current $I_2$ likewise flows through a diode-connected N-FET $N_2$. The gate and drain of the N-FET $N_2$ is likewise coupled to a gate of an N-FET $N_3$, such that the N-FET operates as a current-mirror with respect to the N-FET $N_2$ and the P-FET $P_6$ to conduct the offset current $I_{OFFSET}$.

Therefore, as the charging voltage $V_{CHG}$ gradually increases based on the capacitance of the charging capacitor $C_{CHG}$, the currents $I_1$, $I_2$, and $I_{OFFSET}$ gradually increase at the slew-rate defined by the capacitance of the charging capacitor $C_{CHG}$. The offset current $I_{OFFSET}$ therefore decreases the amplitude of the second transistor input voltage $V_{G\_SHNT}$ across the resistor $R_{G\_RES}$. As a result, the channel of the second power transistor $P_2$ gradually increases to likewise gradually increase the shunt current $I_{SHNT}$ at the slew-rate defined by the capacitance of the charging capacitor $C_{CHG}$. Accordingly, the slew-rate control of the shunt current $I_{SHNT}$ through the shunt resistor $R_{SHNT}$ can mitigate EMI and transient effects in the LED driver circuit 200.

In this description, the term "couple" may cover connections, communications, or signal paths that enable a functional relationship consistent with this description. For example, if device A generates a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal generated by device A.

Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device described herein as including certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor wafer and/or integrated circuit (IC) package) and may be configured to couple to at least some of the passive elements and/or the sources to form the described structure, either at a time of manufacture or after a time of manufacture, such as by an end user and/or a third party.

Modifications are possible in the described embodiments, and other embodiments are possible, within the scope of the claims.

What is claimed is:

1. A light-emitting diode (LED) driver system comprising:

an error amplifier configured to compare an input voltage with a reference voltage to generate a control voltage; and an amplifier output stage configured to control an output current through a first current path and a shunt current through a second current path based on the control voltage, the amplifier output stage comprising a slew-rate controller configured to control a slew-rate of the shunt current such that a rate of increase of an amplitude of the shunt current is less than a rate of increase of an amplitude of the output current.

2. The system of claim 1, further comprising:

a first power transistor configured to conduct the output current in the first current path based on a first transistor input voltage; and a second power transistor configured to conduct the shunt current in the second current path based on a second transistor input voltage.

3. The system of claim 2, wherein the amplifier output stage comprises:

a first control transistor configured to conduct a first control current based on the control voltage to generate the first transistor input voltage; and a second control transistor configured to conduct a second control current based on the control voltage to generate the second transistor input voltage.

4. The system of claim 3, wherein the slew-rate controller is configured to conduct an offset current in parallel with the second control current to generate the second transistor input voltage.

5. The system of claim 4, wherein the slew-rate controller comprises:

a charging current generator configured to generate a charging current;

a charging capacitor that is charged by a charging current to generate a charging voltage; and a current mirror configured to conduct the offset current based on the charging voltage.

6. The system of claim 1, wherein the amplifier output stage is configured to increase the amplitude of the shunt current and decrease the amplitude of the output current as a supply voltage increases.

7. The system of claim 1, wherein the slew-rate controller comprises a charging capacitor having a capacitance that defines the slew-rate of the shunt current.

8. The system of claim 7, further comprising a power transistor configured to conduct the shunt current in the second current path based on a transistor input voltage, wherein the charging capacitor is configured to generate a charging voltage to control an amplitude of an offset current via a current mirror, wherein the offset current is configured to control the transistor input voltage.

9. The system of claim 8, wherein the amplifier output stage comprises a control transistor that is controlled by the control voltage, wherein the control transistor is coupled to an input of the power transistor to set an initial amplitude of the transistor input voltage, wherein the offset current is subtracted from the initial amplitude to control the power transistor based on the slew-rate.

10. The system of claim 1, wherein the shunt current is provided through a shunt resistor in the second current path to generate a shunted current.

11. The system of claim 10, wherein the shunted current is added to the output current to generate a total current.

12. The system of claim 11, wherein an LED string receives the total current.

13. A light-emitting diode (LED) system comprising:

an error amplifier configured to compare an input voltage with a reference voltage to generate a control voltage;

a first current path;

a second current path in parallel with the first current path;

a power transistor coupled to the second current path;

an amplifier output stage configured to control an output current through the first current path and a shunt current through the second current path based on the control voltage; and a slew-rate controller configured to control a slew-rate of the shunt current, wherein in the slew-rate is based on a transient current amplitude spike of the power transistor.

14. The system of claim 13, further comprising:

a shunt resistor in the second current path; and an LED string arranged at an output of the first current path and the second current path.

15. The system of claim 13, wherein the slew-rate controller comprises a charging capacitor having a capacitance that defines the slew-rate of the shunt current.

16. The system of claim 15, wherein:

the power transistor is configured to conduct the shunt current in the second current path based on a power transistor input voltage;

the charging capacitor is configured to generate a charging voltage to control an amplitude of an offset current via a current mirror; and the offset current is configured to control the transistor input voltage.

17. The system of claim 16, wherein:

the amplifier output stage comprises a control transistor that is controlled by the control voltage;

the control transistor is coupled to an input of the power transistor to set an initial amplitude of the transistor input voltage; and the offset current is subtracted from the initial amplitude to control the power transistor based on the slew-rate.

18. The system of claim 13, wherein:

the slew rate increases an amplitude of the shunt current at a first rate;

the output current increases an amplitude of the output current at a second rate; and the first rate is less than the second rate.

* * * * *